(12) United States Patent
Knowles et al.

(10) Patent No.: US 8,122,174 B2
(45) Date of Patent: Feb. 21, 2012

(54) SYSTEM AND METHOD FOR PROVISIONING A REMOTE RESOURCE FOR AN ELECTRONIC DEVICE

(75) Inventors: Michael Knowles, Waterloo (CA); Liam Quinn, Kitchener (CA); Andrew Bocking, Waterloo (CA); Karen Moser, Waterloo (CA); Mark Tiegs, Waterloo (CA); Sherryl Lee Lorraine Scott, Toronto (CA)

(73) Assignee: Research in Motion Limited, Waterloo, Ontario (CA)

( * ) Notice: Subject to any disclaimer, the term of this patent is extended or adjusted under 35 U.S.C. 154(b) by 94 days.

(21) Appl. No.: 11/394,112

(22) Filed: Mar. 31, 2006

(65) Prior Publication Data

US 2007/0239842 A1  Oct. 11, 2007

(51) Int. Cl.
*G06F 12/00* (2006.01)
*G06F 15/16* (2006.01)
*H04L 12/58* (2006.01)
*H04L 12/66* (2006.01)

(52) U.S. Cl. ........ 710/240; 709/217; 709/219; 709/229; 455/412.1; 370/463

(58) Field of Classification Search .......... 717/101–103, 717/117, 120, 121, 125, 130, 171–178, 167, 717/240; 345/156, 501, 530, 902, 903; 709/223, 709/207, 253, 225, 217, 219, 229; 370/420–421, 370/431, 463; 707/10, 240; 718/104; 725/135; 710/240; 455/412.1
See application file for complete search history.

(56) References Cited

U.S. PATENT DOCUMENTS

| | | | | |
|---|---|---|---|---|
| 6,133,847 A * | 10/2000 | Yang | ........................ | 340/825.22 |
| 6,275,693 B1 * | 8/2001 | Lin et al. | ..................... | 455/414.3 |
| 6,292,833 B1 * | 9/2001 | Liao et al. | ...................... | 709/229 |
| 6,389,555 B2 * | 5/2002 | Purcell et al. | .................... | 714/10 |
| 6,393,569 B1 * | 5/2002 | Orenshteyn | ....................... | 726/4 |
| 6,760,770 B1 * | 7/2004 | Kageyama | .................... | 709/229 |
| 6,813,489 B1 * | 11/2004 | Wu et al. | ..................... | 455/412.1 |
| 6,868,444 B1 * | 3/2005 | Kim et al. | ..................... | 709/223 |
| 6,973,095 B1 * | 12/2005 | Carrel et al. | .................. | 370/463 |
| 6,983,321 B2 * | 1/2006 | Trinon et al. | ................. | 709/224 |
| 7,035,630 B2 * | 4/2006 | Knowles | | |

(Continued)

OTHER PUBLICATIONS

"Maintaining remote services and resources over the internet and other networks" by Wolfe et al. (abstract only) Publication date: Jun. 10-12, 2002.*

(Continued)

*Primary Examiner* — Mark Rinehart
*Assistant Examiner* — Christopher Daley
(74) *Attorney, Agent, or Firm* — McCarthy Tétrault LLP

(57) ABSTRACT

The invention provides a system and method for updating a resource to an electronic device. The method provisions a resource to an electronic device by: (a) maintaining the resource at a remote server from the device; and (b) after a triggering event, providing a data transmission to the device containing access information for the resource. The system incorporates the method and comprises: a resource providing information for the device; a server to maintain the resource; a communication link providing the device with access to the resource; a data transmission module for extracting and transmitting access information about the resource to the device; and a data processing module for processing the received information at the device. In the device, a GUI provides information on a topic retrieved from local storage on the device and additional information about the resource is incorporated into the GUI for that topic.

18 Claims, 9 Drawing Sheets

U.S. PATENT DOCUMENTS

| | | | |
|---|---|---|---|
| 7,107,548 B2* | 9/2006 | Shafron | 715/826 |
| 7,139,811 B2* | 11/2006 | Lev Ran et al. | 709/217 |
| 7,155,425 B2* | 12/2006 | Nykanen | 707/3 |
| 7,185,333 B1* | 2/2007 | Shafron | 717/173 |
| 7,187,660 B2* | 3/2007 | Shell et al. | 370/254 |
| 7,194,503 B2* | 3/2007 | Shell et al. | 709/202 |
| 7,209,248 B1* | 4/2007 | Govindarajan et al. | 358/1.15 |
| 7,225,409 B1* | 5/2007 | Schnarel et al. | 715/747 |
| 7,239,877 B2* | 7/2007 | Corneille et al. | 455/456.3 |
| 7,260,608 B2* | 8/2007 | Kuki | 709/206 |
| 7,266,369 B2* | 9/2007 | Moles et al. | 455/418 |
| 7,283,059 B2* | 10/2007 | Harris et al. | 340/825.69 |
| 7,325,203 B2* | 1/2008 | Katano | 715/765 |
| 7,340,057 B2 | 3/2008 | Martin, Jr. et al. | |
| 7,506,059 B2* | 3/2009 | Mulligan | 709/230 |
| 7,512,401 B2* | 3/2009 | Muhonen et al. | 455/414.1 |
| 7,571,313 B2 | 8/2009 | Messerges et al. | |
| 7,587,512 B2* | 9/2009 | Ta et al. | 709/233 |
| 7,765,309 B2* | 7/2010 | Spearman et al. | 709/229 |
| 2001/0029178 A1* | 10/2001 | Criss et al. | 455/419 |
| 2002/0123335 A1* | 9/2002 | Luna et al. | 455/419 |
| 2002/0131404 A1 | 9/2002 | Mehta et al. | |
| 2002/0158912 A1 | 10/2002 | O'Rourke | 345/810 |
| 2003/0023849 A1* | 1/2003 | Martin et al. | 713/176 |
| 2003/0027581 A1* | 2/2003 | Jokinen et al. | 455/456 |
| 2004/0116115 A1* | 6/2004 | Ertel | 455/426.2 |
| 2004/0125130 A1* | 7/2004 | Flamini et al. | 345/738 |
| 2004/0128345 A1* | 7/2004 | Robinson et al. | 709/203 |
| 2004/0198379 A1* | 10/2004 | Magee et al. | 455/456.1 |
| 2004/0222877 A1* | 11/2004 | Teramura et al. | 340/5.65 |
| 2004/0242209 A1* | 12/2004 | Kruis et al. | 455/414.1 |
| 2005/0015462 A1* | 1/2005 | Lee et al. | 709/217 |
| 2005/0021369 A1* | 1/2005 | Cohen et al. | 705/2 |
| 2005/0033830 A1* | 2/2005 | Gorty | 709/220 |
| 2005/0059393 A1* | 3/2005 | Knowles | 455/432.3 |
| 2005/0113064 A1* | 5/2005 | Halsell | 455/406 |
| 2005/0198220 A1* | 9/2005 | Wada et al. | 709/220 |
| 2005/0216829 A1* | 9/2005 | Kalinichenko et al. | 715/513 |
| 2005/0240672 A1* | 10/2005 | Chen et al. | 709/229 |
| 2005/0289558 A1 | 12/2005 | Illowsky et al. | |
| 2006/0030303 A1* | 2/2006 | Albertsson et al. | 455/414.2 |
| 2006/0080444 A1* | 4/2006 | Peddemors et al. | 709/227 |
| 2006/0088004 A1* | 4/2006 | Casey et al. | 370/329 |
| 2006/0129638 A1* | 6/2006 | Deakin | 709/203 |
| 2006/0140144 A1* | 6/2006 | Bruner et al. | 370/328 |
| 2006/0155851 A1* | 7/2006 | Ma et al. | 709/226 |
| 2006/0185500 A1* | 8/2006 | Komano | 84/609 |
| 2006/0212537 A1* | 9/2006 | Hans et al. | 709/217 |
| 2006/0223563 A1* | 10/2006 | Sung et al. | 455/518 |
| 2006/0277231 A1* | 12/2006 | Kral et al. | 708/102 |
| 2007/0067426 A1* | 3/2007 | Goyal et al. | 709/223 |
| 2007/0073704 A1* | 3/2007 | Bowden et al. | 707/10 |
| 2007/0093201 A1* | 4/2007 | Hsu et al. | 455/3.04 |
| 2007/0136400 A1* | 6/2007 | Ames et al. | 707/205 |
| 2007/0156856 A1* | 7/2007 | Shafron | 709/219 |
| 2007/0178895 A1* | 8/2007 | Bot | 455/432.1 |
| 2008/0003991 A1* | 1/2008 | Sievers et al. | 455/418 |

OTHER PUBLICATIONS

"Title: Method for multi-distributing software to computers for management through pyramid transmission between clients"; Derwent-Acc-No. 2005-148373 (abstract only) Publication Date: Oct. 16, 2004.*

"A mobile-agent-based PC grid" by Fukuda et al. (abstract only) Publication date: Jun. 25, 2003.*

* cited by examiner

This is the help application provided to you for your device from your wireless carrier. Your local time is 12:00 PM The carrier is fully operational.

Please enter a search term to obtain more information about the carrier or your device, then activate the GO button:

GO!

If you wish to retrieve further information about the local applications available to you, please click here

SYSTEM AND METHOD FOR PROVISIONING A REMOTE RESOURCE FOR AN ELECTRONIC DEVICE

FIELD OF THE INVENTION

The invention relates to providing a resource, such as data, information, text or a file, to a communication device. More particularly, the invention relates to a system and method for provisioning dynamic resources through a central server for the device.

BACKGROUND

Mobile communication devices allow their users to communicate with others in more flexible ways and at more flexible times. Frequently, it is useful to provide such devices with resources, such as data files, help files, text and other information. Some resources may be pre-loaded into a device at manufacturing time, but it may be difficult to manage and maintain an update regime for that device. If a device has a help application, for example, and if the text for the application is permanently stored in the device, it is difficult to make changes and update the text.

It is desirable to provide an improved system and method for dynamically managing resources provided to one or more electronic devices.

SUMMARY

In accordance with an aspect of the invention, a method of provisioning a resource to an electronic device is provided. The method comprises the steps of: (a) maintaining the resource at a remote server from the device; and (b) after a triggering event, providing a data transmission to the device, the data transmission containing access information for the resource that can be extracted by the device and used to access the resource.

In the method the transmission may further contain text information about the resource and the access information is a link to a web page associated with the resource.

In the method, the text information may be incorporated into a graphical user interface (GUI) operating on the device; and the GUI provides an interface to access and activate the link through a browser operating on the device.

In the method, the GUI may also provide information about the device that is stored locally on the device.

In the method, the resource may provide information relating to a wireless carrier associated with the device. Alternatively, the resource may provide information relating to a user's account associated with the device. Alternatively still, a second resource may be provided to the device with access information and text information relating to the second resource provided to the device; and the GUI may prioritize the presentation the text information for the resource and the second resource based on a ranking scheme. The triggering event may relate to the recent appearance of the device to a communication network associated with the resource.

In a second aspect, a system for provisioning a resource to an electronic device is provided. The system comprises: a resource providing information for the device; a server providing maintenance for the resource; a communication link providing the device with access to the resource; a data transmission module for extracting access information about the resource and selectively providing the access information to the device in a data transmission through the communication link; and a data processing module for receiving the data transmission and updating access information in the device for the resource. In the device, a GUI provides information on a topic retrieved from local storage on the device and additional information about the resource is incorporated into the GUI for that topic.

In the system, the data transmission may further contain text information about the resource and the access information may be a link to a web page associated with the resource.

In the system, the text information may be incorporated into the GUI operating on the device; and the GUI may provide an interface to access and activate the link through a web browser operating on the device.

In the system, the device may also provide information that is stored locally on the device that is provided in the GUI.

In the system, the resource may provide information relating to a wireless carrier associated with the device. Alternatively, the resource may provide information relating to a user's account associated with the device.

In the system, a second resource may be provided to the device with access information and text information relating to the second resource provided to the device; and the GUI may prioritize the text information of the resources based on a ranking scheme.

In the system, the data transmission module may selectively build and send the data transmission upon receipt of a triggering event relating to the status of the device.

In the system, the triggering event may be based on the location of the device. Alternatively, the triggering event may be a status of the device as known by the server.

Additional features and aspects of the invention are described in the following description of several exemplary embodiments of the invention.

BRIEF DESCRIPTION OF THE DRAWINGS

In the drawings:

FIG. 4 is an exemplary screen image produced on the display of the device of FIG. 1 when a help application is being executed thereon according to an embodiment;

DETAILED DESCRIPTION

The present invention provides a system and method for provisioning resources to an electronic device. Typically, although not necessarily, the device is a mobile, wireless communication device. The associated resource is dynamically provided to the device from a remote source, such as a server. As such, the resource may be dynamically maintained, updated and changed at the remote source, thereby providing the device (and other devices accessing the resource) with common set of data and information for that resource.

Figure 1:
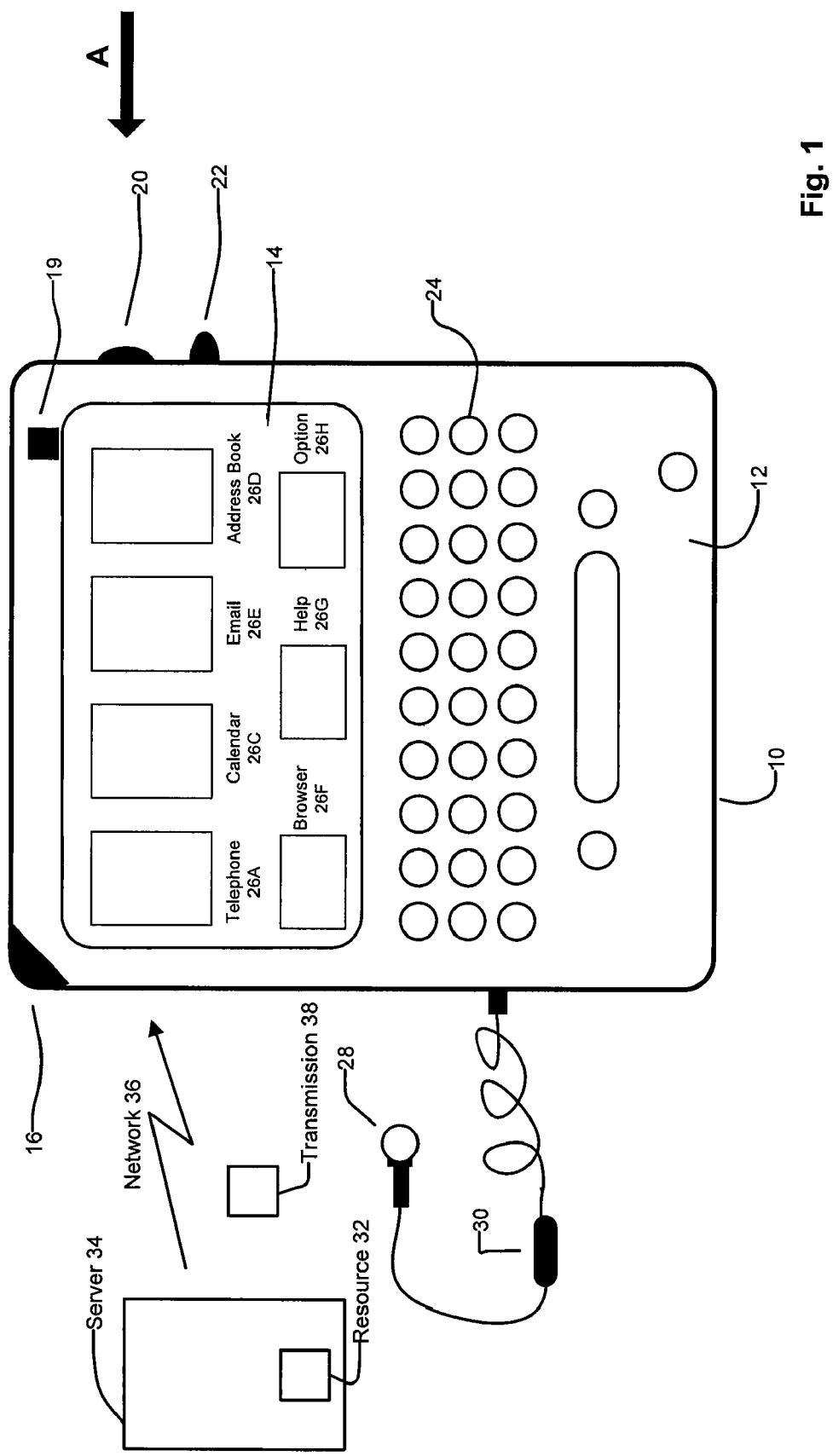
FIG. 1 is a schematic diagram of a resource provided to an electronic device as per an embodiment.

First, a description is provided relating to a device that accesses a resource managed by an embodiment. Referring to FIG. 1, an electronic device for receiving electronic communications, in accordance with an embodiment of the invention is indicated generally at 10. In the present embodiment, electronic device 10 is based on a computing platform having functionality of an enhanced personal digital assistant with cellphone, web browsing and e-mail features. Such functionalities are provided through software and firmware modules operating on device 10. It is, however, to be understood that electronic device 10 can be based on construction, design and functions of other electronic devices, such as smart telephones, desktop computers pagers or laptops having telephony equipment. In a present embodiment, electronic device 10 includes, a housing 12, which frames an LCD display 14, a speaker 16, an LED indicator 19, a trackwheel 20, an exit key 22, keypad 24 and a telephone headset comprised of an ear bud 28 and a microphone 30. Trackwheel 20 and exit key 22 can be inwardly depressed along the path of arrow "A" as a means to provide additional user-input. Keypad 24 is shown as a matrix of three rows of keys with each row having ten keys. In other embodiments a directional key can be provided (not shown), where it is a "rocker"-type key that has a center rest position and can be tilted or moved from its rest position in one of several directions (e.g. up, down, left or right, when viewing the front of device 10) to activate a programmed function associated with the direction of activation. A joystick or a rollerball input device may also be provided instead or in addition to a directional key. Other arrangements of input / output devices (including the number, configuration and layout keys, display, speakers etc.) may be used.

Remote resource 32 is managed and maintained by server 34. Resource 32 may be a file, data or a combination of other resources. Resource management software operating on server 34 allows resource 32 to be updated and information about resource 32 to be extracted and distributed to device 10. The software can periodically extract and build reference data transmissions through data packets 38 about resource 32. The resource management software allows a user at the server to update and manage the content and associated text and links for resource 32. The software may also control or signal when a data transmission should be created and provided to one or more devices 10. Any trigger may initiate the data transmission, including a change in resource 32, a change in the network or detection of any new devices to the network. It will be appreciated that the devices may be notified of changes or new resources 32 by other communication methods. For example, in another embodiment, the management software may generate and send an email message to device 10 containing a notification of the new content and access link for resource 32. Alternatively, a specific background transmission may be sent to device 10 that is received and processed by device 10 without any interaction by its user. The transmission may include a command to update a text message in a GUI of an application to indicate that new content is available. For example, the command may produce a special "*" flag in the GUI that indicates the presence of the new content. Other commands and messages may be provided. Thereafter, the software can forward data packets 38 to a transmission interface of communication network 36 for conversion and transmission to one or more devices 10. Network 36 may provide a wired connection, a wireless connection or a combination of both between server 34 and device 10.

Figure 2:
FIG. 2 is another schematic diagram of the electronic device of FIG. 1 illustrating a graphical user interface (GUI) screen on its display.

Referring to FIGS. 1 and 2, further detail is provided on device 10 and how it requests, receives and processes data packets 38 from resources 32. Device 10 has components therein to receive such data packets 38 from network 36 and to extract and process data from any received data packets 38. The data extracted from data packets 38 is used by applications operating on device 10.

Referring to FIG. 1, various applications are provided on device 10, including email, telephone, calendar, address book and help applications. A GUI to activate these applications is provided on display 14 through a series of icons 26. Some of the shown icons include telephone icon 26A, calendar icon 26C, address book icon 26D, email icon 26E, web browser icon 26F and help icon 26G and option icon 26H. Such applications can be selected and activated using the keypad 24 and/or the trackwheel 20 to navigate through icons 26 and individually highlight same. Cursor 40 provides a visual cue for each icon as it indicates what icon 26 is currently being "highlighted" as the icons are being navigated. Referring to FIG. 2, at the bottom of display 14 a corresponding text message may be generated to provide additional information relating to the currently highlighted icon 26. For example, when option icon 26H is highlighted, the text "option" is presented at the bottom of display 14.

Device 10 may be configured to operate with one or more standardized content languages such as WML or HTML, to allow standardized pages of data and forms to be transmitted to it and to be displayed on display 14. This may be done by installing (or having installed) an appropriate browser application on device 10. The data packets transmitted to device 10 may include pages formatted in a content language for which device 10 is configured. Alternatively, the data packets may identify the address of a server where such pages are available.

In the embodiment, the resource 32 is accessed through an application, such as the help application. Generally, the application provides a GUI for configuring operational parameters of device 10 (e.g. local time display preferences, font sizes etc.). Specifically, Help application provides additional information on any topic, such as help information, relating to services, features and notices for the communication network associated with device 10. In an embodiment resources access through the help application is pre-loaded on the device. The resources may relate to general help information and specific information for specific application. This pre-loaded help information about a topic may be enhanced, supplemented or augmented by the additional information provided by resource 32. It will further be appreciated that the GUI can encompass any visual interface generated on device 10 that provides any combination of text and graphics content to the user and not just a combination of selection menus, drop down menus, radio buttons and other interfaces that allow a user to make a selection from a set of choice during execution of the application associated with the GUI. Further it will be appreciated that the application generating the GUI can provide routines that can modify the textual/graphical content of the GUI by inserting links to resource 32 within that content whenever that textual/graphical information is presented to the user. Further the links are dynamic in that they reflect any changes to the links that are provisioned on the device at any given point in time.

Figure 3:
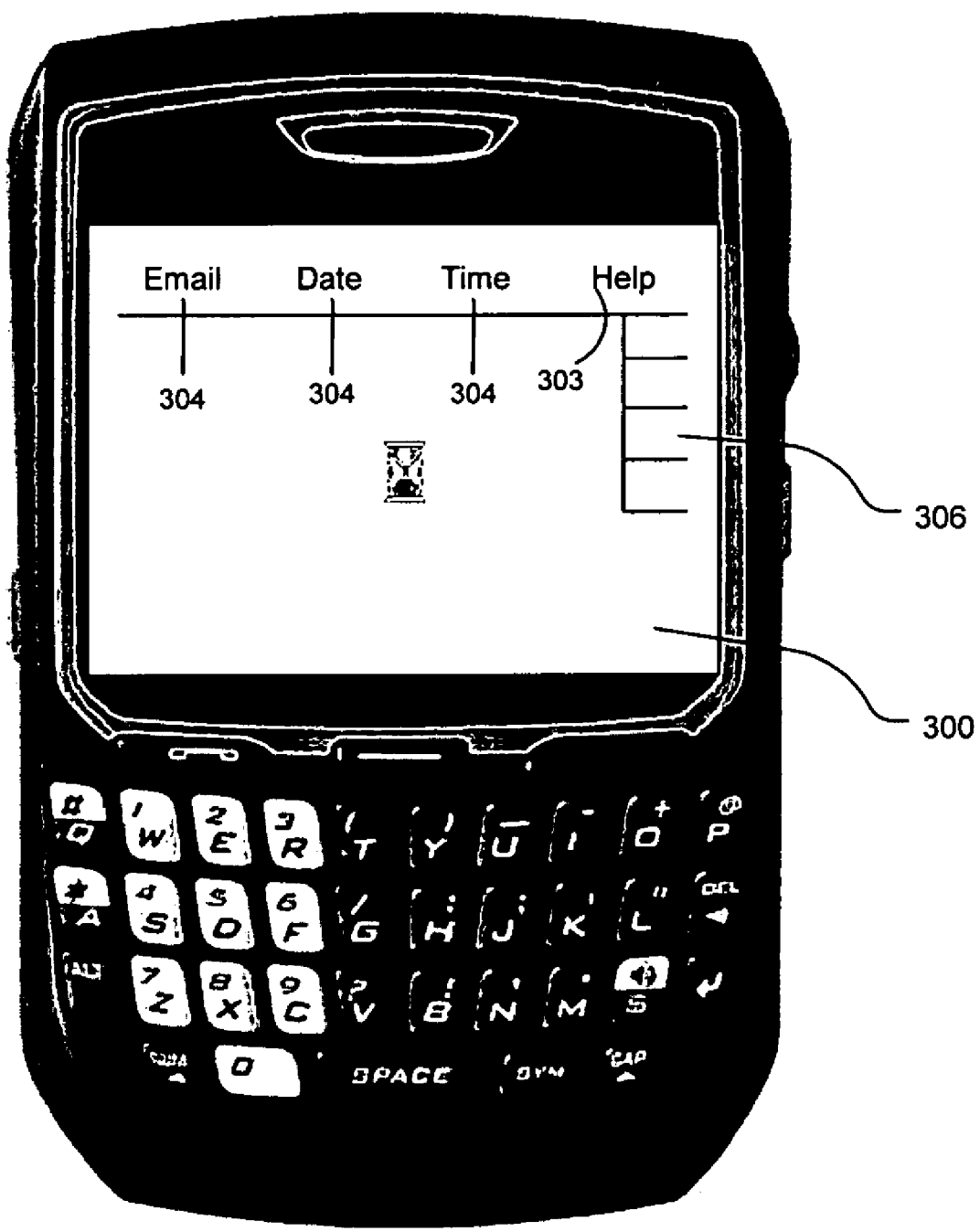
FIG. 3 is another schematic diagram of the device of FIG. 1 showing another GUI screen on its display.

In FIG. 3, an exemplary screen shot 300 generated on display 14 is shown when the help application is operating on device 10. Generally, the help application presents navigable web pages that provides text, video and audio clips about device 10 or one or more applications operating on it.

Additional information may be provided by resource 32. The text displayed in the appropriate location in the GUI may be customized to provide additional information for the resource. Activation of the entry (or text) in the menu will cause device 10 to access resource 32. Alternatively or additionally, additional information provided by resource 32 may be inserted as additional links in the actual descriptions generated in the help application.

Additionally, a series of cascading menu bars, drop down menus and selections through a GUI are provided as the user navigates through the application. For example, help application may generate a GUI menu bar 302 at the top of display 14 containing a series of selections 304 therein. Additional "pull down" menu 306 is generated when a selection is activated or highlighted. A user navigates through bar 302 and menu 306 using a combination of input devices such as wheel 20, exit key 22 and key pad 24. The interface for controlling navigation through the GUI using signals generated by the input devices is provided by software and firmware modules operating on device 10. Such modules are known to those skilled in the art. One or more entries in either the pull down menu 306 or the selection 304 in the bar 302 may relate to resource 32 provided by an embodiment through information provided from data packets 36. Other GUI implementations may be used including pop-up-menus that appear when the user clicks a specific key (such as the trackwheel) and disappear when the user presses another button (such as the escape button). As an example, a pop-up menu may be generated when a new or updated resource 32 is available from a server 34 (after the server software generates and sends an appropriate message to device 10). An option for the GUI is that the pop-up feature may be selectively enabled.

Referring to FIG. 4, exemplary screen shot 400 generated by a help application on display 14 of device 10 is shown. The help application had been activated from the option application using the GUI noted above. The help application provides information on any relevant topic as designated for device 10. The information may be customized for device 10, the location of device 10, the state of the device or the carrier connecting to device 10. The contents of the screen shot include can include any static and variable data, including text, and status information provided by resource 32. For example, text in any of the boxes may be linked to a web link (as provided in the data packets relating to resource 32) to one or more remote web sites associated with remote resource 32. The help application has taken the access and text information from the data packets and has embedded the text information and any link access commands to the associated remote link into the GUI. The contents can provide static text, images, video clips, access to search screens and other media information through display 14. Additional media, such as audio clips, can be presented through ear bud 28. As such, a resource 32, text relating to the resource and access information for resource 32 can be integrated with the GUI of the help application (or other applications), such that the resource effectively becomes an extension to the application (as opposed to generic, non-application-specific, downloadable content), thereby providing the ability to extend the look and feel of those applications, dynamically, in the field.

Figure 5:
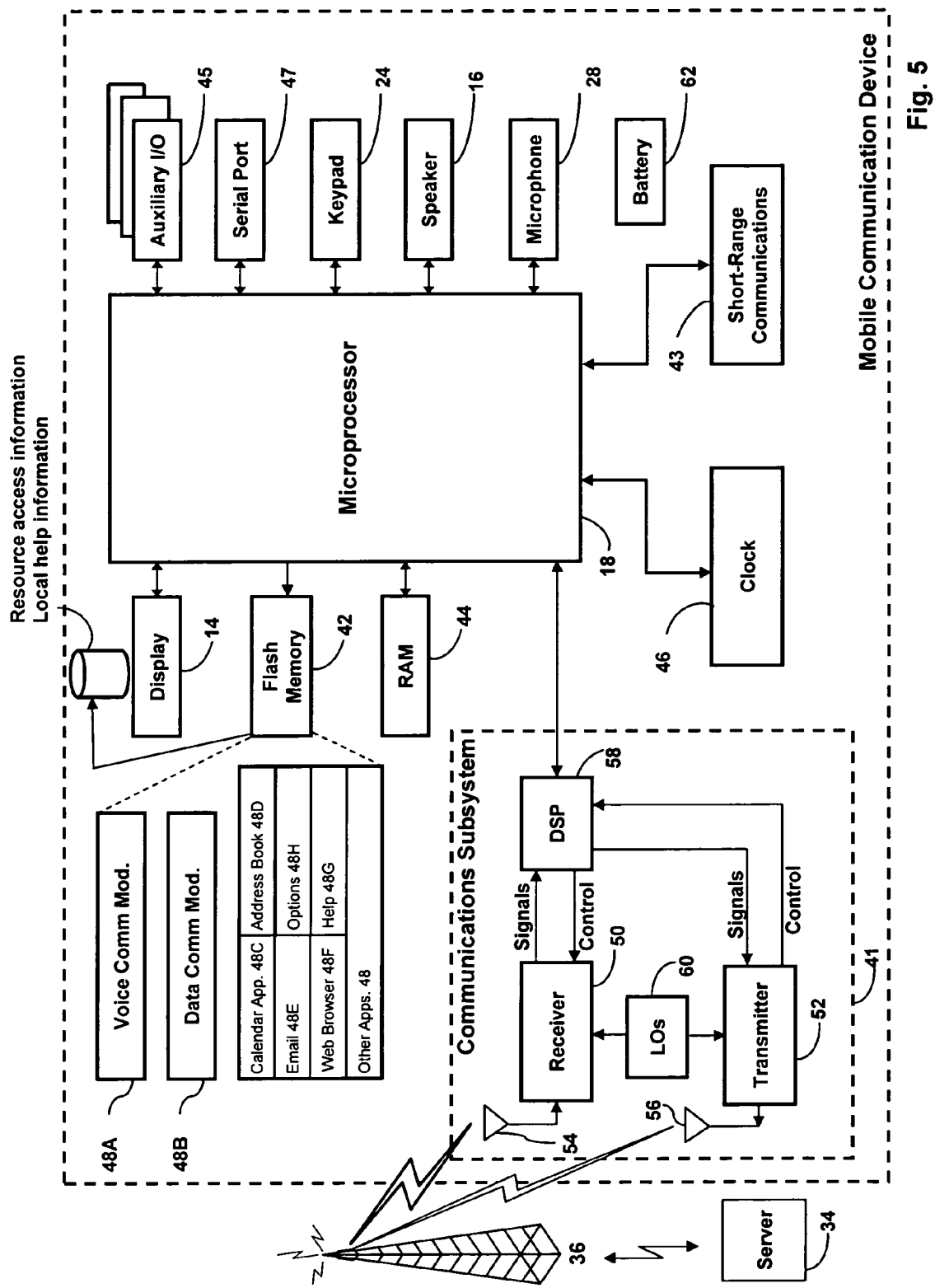
FIG. 5 is a block diagram of internal components of the device of FIG. 1.

Referring to FIGS. 1 and 5, further detail is now provided on the help application resource and how it is accessed by device 10. Generally, some local resources managed by an embodiment may be stored locally on device 10; however, additional resources 32 may be accessed remotely from device 10. Specifically for information provided through a help application, some content is already pre-loaded on the device 10 to allow it to be accessible when the device is out of coverage from the network. However, additional remote resources may be provided through web links to supplement the help information pre-loaded on device 10. Such remote resources 32 may be provisioned to device 10 through server 34. When a server 34 is provided, then one or more devices 10 can access resource 32 and resource 32 can be centrally managed, maintained and distributed. Any particular information required by device 10 on how to access resource 32 may be provided by server 34 through data packets 38 generated and sent from server 34 to device 10.

Referring to FIG. 5, functional elements of device 10 are provided. The functional elements are generally electronic or electro-mechanical devices. In particular, microprocessor 18 is provided to control and receive almost all data, transmissions, inputs and outputs related to device 10. Microprocessor 18 is shown schematically as coupled to keypad 24, display 14 and other internal devices. Microprocessor 18 controls the operation of the display 14, as well as the overall operation of the device 10, in response to actuation of keys on the keypad 24 by a user. Exemplary microprocessors for microprocessor 18 include Data 950(trade-mark) series microprocessors and the 6200 series microprocessors, all available from Intel Corporation.

In addition to the microprocessor 18, other internal devices of the device 10 include: a communication subsystem 41; a short-range communication subsystem 43; keypad 24; and display 14; with other input/output devices including a set of auxiliary I/O devices through port 45, a serial port 47, a speaker 16 and a microphone port 32 for microphone 30; as well as memory devices including a flash memory 42 (which provides persistent storage of data) and random access memory (RAM) 44; clock 46 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by microprocessor 18 is preferably stored in a computer readable medium, such as flash memory 42, but may be stored in other types of memory devices, such as read only memory (ROM) or similar storage element. In addition, system software, specific device applications, or parts thereof, may be temporarily loaded into a volatile storage medium, such as RAM 44. Communication signals received by the mobile device may also be stored to RAM 44.

Microprocessor 18, in addition to its operating system functions, enables execution of software applications on device 10. A set of software applications 48 that control basic device operations, such as a voice communication module 48A and a data communication module 48B, may be installed on the device 10 during manufacture or downloaded thereafter.

Communication functions, including data and voice communications, are performed through the communication subsystem 41 and the short-range communication subsystem 43. Collectively, subsystem 41 and subsystem 43 provide the signal-level interface for all communication technologies processed by device 10. Various other applications 48 provide the operational controls to further process and log the communications. Communication subsystem 41 includes receiver 50, transmitter 52 and one or more antennas, illustrated as receive antenna 54 and transmit antenna 56. In addition, communication subsystem 41 also includes processing module, such as digital signal processor (DSP) 58 and local oscillators (LOs) 60. The specific design and implementation of communication subsystem 41 is dependent upon the communication network in which device 10 is intended to operate. For example, communication subsystem 41 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Communication subsystem 41 provides device 10 with the capability of communicating with other devices using various communication technologies, including instant messaging (IM) systems, text messaging (TM) systems and short message service (SMS) systems.

In addition to processing communication signals, DSP 58 provides control of receiver 50 and transmitter 52. For example, gains applied to communication signals in receiver 50 and transmitter 52 may be adaptively controlled through automatic gain control algorithms implemented in DSP 58.

In a data communication mode a received signal, such as a text message or web page download, is processed by the communication subsystem 41 and is provided as an input to microprocessor 18. The received signal is then further processed by microprocessor 18 which can then generate an output to the display 14 or to an auxiliary I/O port 45. A user may also compose data items, such as e-mail messages, using keypad 24, a thumbwheel associated with keypad 24, and/or some other auxiliary I/O device connected to port 45, such as a touchpad, a rocker key, a separate thumbwheel or some other input device. The composed data items may then be transmitted over communication network 68 via communication subsystem 41.

In a voice communication mode, overall operation of device 10 is substantially similar to the data communication mode, except that received signals are output to speaker 16, and signals for transmission are generated by microphone 30. Alternative voice or audio I/O subsystems, such as a voice message recording subsystem, may also be implemented on device 10.

Short-range communication subsystem 43 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices. A WiFi connection may also be provided.

Powering the entire electronics of the mobile handheld communication device is power source 62. Preferably, the power source 62 includes one or more batteries. More preferably, the power source 62 is a single battery pack, especially a rechargeable battery pack. A power switch (not shown) provides an "on/off" switch for device 10. Upon activation of the power switch an application 48 is initiated to turn on device 10. Upon deactivation of the power switch, an application 48 is initiated to turn off device 10. Power to device 10 may also be controlled by other devices and by internal software applications.

Brief descriptions are provided on the applications 48 stored and executed in device 10. Additional applications include calendar 48C which tracks appointments and other status matters relating to the user and device 10. Calendar 48C is activated by activation of calendar icon 26 on display 14. It provides a daily/weekly/month electronic schedule of appointments, meetings and events entered by the user. Calendar 48C tracks time and day data for device 10 using processor 18 and internal clock 46. The schedule contains data relating to the current accessibility of the user. For example it can indicate when the user is busy, not busy, available or not available. In use, calendar 48C generates input screens on device 10 prompting the user to input scheduled events through keypad 24. Alternatively, notification for scheduled events could be received via an encoded signal in a received communication, such as an e-mail, SMS message or voicemail message. Once the data relating to the event is entered, calendar 48C stores processes information relating to the event; generates data relating to the event; and stores the data in memory in device 10.

Address book 48D enables device 10 to store contact information for persons and organizations. Address book 48D is activated by activation of address book icon 26 on display 14. In particular, name, address, telephone numbers, e-mail addresses, cellphone numbers and other contact information is stored. The data can be entered through keypad 24 and is stored in an accessible a database in non-volatile memory, such as persistent storage 70, which is associated with microprocessor 18, or any other electronic storage provided in device 10.

Email application 48E provides modules to allow user of device 10 to generate email messages on device 10 and send them to their addressees. Application 48E also provides a GUI which provides a historical list of emails received, drafted, saved and sent. Text for emails can be entered through keypad 24. Email application 48E is activated by activation of email icon 26 on display 14.

Browser application 48F is an application that can access information from the Internet (such as HTML or active documents) or an intranet, as well as folders in the local file system and on a network and generate results on display 14. Such applications are known in the art. If a link (as an address) to a web site is provided by another application to browser 48F, it will search the Internet or intranet (as relevant) for the web site associated with the link.

Help application 48G provides text, audio images, video images and links to additional information to provide general help on various topics relating to device 10, its applications, its services or its connections to wireless carriers. Some of the information and resources may be stored locally on device 10. Additional external resources may be provided from resource 32. Links to the external resources may be provided as web page addresses embedded in the information locally stored on device 10. The remote resources may relate to specific applications, general application, information specific to the user himself or the device or class of devices (e.g. relating to models, manufacturers and specific features provided to devices) or any other information that can be remotely stored and selectively provided to device 10.

Option application 48H is an application that provides a GUI for a user to review and change configuration options and retrieve operating information about device 10. Some of the resources for the information come from device 10. Other resources are remote to device 10 and are accessed through network 36. Preferably, all accesses are seamless to the user.

Further detail is provided on remote resource management, maintenance and distribution systems as provided by server 34 for device 10.

One implementation for a shared resource 32 accessible by device(s) 10 is for an embodiment is "help" information for application 48G. The help information can relate to general help and information about services provided for device(s) 10 and broadcast information about the network that device(s)

are connected to. One or more help resources may be provided on device 10 through its GUI.

As noted, the help information can be pre-loaded on device 10. For example, a locally stored web-page may be provided on device 10 that provides a user with information on general (non-application specific) content and application-specific content. Additional remote information from resource 32 may be embedded into the pre-loaded help information. The additional information may be automatically sought by device 10 or specific access links (such as web links) may be embedded into the pre-loaded information.

Alternatively, an access choice in menu option for the remote resource 32 may be built into the GUI for device 10. With the above described GUI for device 10, the help menu item can be used to present remote resources 32 to device 10. As noted, the help menu can provide additional text relating to the resource.

Alternatively still, the help information may be all based on remote resource 32.

In providing remote resource 32 to device 10, remote resource 32 typically has at least two data elements associated with it in device 10: access information for the resource; and any ancillary text that is to be displayed through the GUI for the resource 32. Both data elements are provided to and stored on device 10 in its non-volatile memory. All relevant applications operating on device 10 can access both data elements.

The first data element provides a link to the resource itself. As the resource is centrally managed, the link provides an indirect method of accessing the resource. Different embodiments provide different types of links. One link is an accessible link, such as a Universal Resource Link (URL) that is provided to device 10 and can be selectively activated on device 10 to access the associated resource. The URL provides an HTTP address for a page at a web site that provides the resource (help information); an exemplary URL would be http://www.helppage.com/page1.html. In use, when a user navigates through screen 300 and activates the menu option associated with the help resource, the associated URL is retrieved by device 10 and is provided to its web browser application. Next, the web browser sends a request for the noted HTML page to its web server. The web server then accesses the Internet to retrieve and display the web page. The web page itself is stored on a remote server (as associated with the web address of the URL). As such, the specific contents of the web site and its particular links can be managed remotely from device 10.

In an alternative embodiment, the first data element provides a link to a FTP site, where an executable file providing an application as a downloadable software program that can be downloaded, stored and executed on device 10. As such, the data in device 10 does not need to maintain the resource.

The second data element is typically a text string providing a short description of the resource that is incorporated into the GUI when the user navigates through a GUI that allows access to the resource. In some embodiments, the second data element may not be provided.

The above noted data elements (and additional data elements) relating to the resource(s) may be provided to device 10 through several mechanisms. One simple mechanism is manual entry and storage of the data elements into device 10 through a user input screens. The screen prompts the user to enter the relevant links and text manually through input dialog boxes. Once the data elements are entered, they are processed and stored in the non-volatile memory. Then the resource (and its related information) can be accessed by device 10 as necessary through the GUI noted above. This mechanism requires the user to have accurate knowledge of the data elements.

A more preferable mechanism is to automatically download the data elements into device 10. The downloading of the data elements requires a data processing module operating on device 10 to receive and process a data packet 38 from an external server 34, then extract the relevant data elements from it and store the elements in relevant non-volatile memory of device 10. For the embodiment, the data packet 38 is provided as a service record, which is a transmittable data structure containing set fields where dedicated fields contain the contents of element. The data packet has a predefined and known structure of fields so that certain data elements are expected at certain accessible locations in the data packet. As such, expected data elements can be extracted from the packet by device 10. The data packet may have a header fields for one or more of the data elements. The data packet can contain almost any type of information that relates to either the device, user, the user's account, carrier service or one or more applications. Different databases can store different information. A particular data packet relating to particular information may be selectively generated and sent to one or more devices depending on triggering conditions set by the embodiment.

It will be seen that a data packet can be generated by resource server 34 associated with the resource 32, which can then encode and transmit the data packet through its associated communication network to one or more devices 10. The extraction and transmission of the access information is provided by a data transmission module operating on server 34 and resource 32. Transmission of the data packet may be provided based on predetermined conditions. One transmission condition may be the detection of a new device 10 within the transmission capabilities of the communication network 36. For a wireless communication network the transmission capabilities may be set by the transmission range of the network. For a wired communication network, the transmission capabilities may be limited to the devices 10 that are connected to predetermined access points to the network.

Another transmission condition may be to periodically generate and broadcast the data packet to all devices 10 that are in transmission capabilities of the communication network. For example, the data packet may be sent whenever the server initiates a change to the resource.

For the embodiment, the data packet 38 is also known as a service record. Service records for one or more resources 32 may be provided through one or more resource servers 34. Each resource servers can communicate with device 10 to selectively provide a service record to device 10 through its associated communication network 36. To assist in identifying resource servers 34, each resource server 34 can be provided with a unique identification address to identify it to devices 10 and other servers 34.

Further detail is now provided on the operation of the resource servers 34. It will be appreciated that device 10 can be configured to operate on one or more communication networks. The networks may include wireless components and the device may have a wireless or wired communication system, or it may have both wireless and wired communication systems. In some embodiments, the device is configured to operate on a wireless network that permits access to a wire-based network such as the Internet.

The embodiment provides several resource servers 34 including a registration server, a corporate mobile data service (MDS) server, a public MDS server, a generic provisioning server, a wireless application protocol (WAP) server. Each server can manage different resources and as such different help resources. Each server may be positioned at different access points within the communication network(s) for device 10 (e.g. behind firewalls, incorporated with local corporate servers, incorporated with specific carriers for wireless/wired services, incorporated with a generic services for multiple carriers, etc.). As such, different servers can provide different levels of security, access and speed of access when providing resources to devices 10. Each server may also have different protocols for providing their updated service records to device 10. Each server may provide resources 32 relating to applications, accounts, access information, carrier information (if applicable), devices, or other information that it can store, process or extract from any of its related systems and software.

One feature of an embodiment provides a selectable prioritization protocol when two or more resources 32 are provided from one or more servers 34. When two or more service records 38 are received by device 10, the prioritization protocol, if implemented, ranks the service records 38 according to a preset ranking scheme. Following the scheme, the presentation arrangement in the GUI for the received and extracted links from the service records may be presented in an order reflecting the ranking. In some instances where there is a conflict or ranking of resources between two or more service records, only a subset of the service records may be used and presented in the GUI. It will be appreciated that the protocol may be based on several factors including a relative trustworthiness of resource server, redundancy of information provided by one resource in view of the availability of another resource from another server, speed of access from a server, etc.

Based on the received service records 38 and any prioritization protocols applied there against, the GUI may be modeled on device 10 to show the resources in a certain order, show some resources as subgroups in a menu, and not show selected resources or a combination of any ranking techniques.

As an example of provisioning a resource 32 to device 10, further detail is provided on the processing of a service record 38 received by device 10 from a registration server 34 for a communication network 36. The communication network is a wireless network provided by a given carrier. As such, the carrier is offering wireless services to its customers and sells, rents and leases devices 10 to its customers. An address is associated with the registration server 34 to identify the registration server in its communication network 36. For devices 10 connecting to the communication network 36, the address of the registration server may be stored in the device after it is manufactured. This may be done by the carrier, an operator of the wireless network relating to the device or by another entity. Typically, the address of the registration server will be designated by the provider of the communication network.

Eventually the device 10 is delivered to a user. The user may obtain the device from the wireless network operator or from a reseller who sells the device on behalf of one of the operator. After obtaining the device, the user enables the communication system of the device. The communication system detects the presence of at least one of the networks 36 and uses the stored address of the registration server 34 to send a registration request to the registration server. The registration server, in conjunction with a provisioning server determines whether the device may be provisioned with a service record using the present method. If the service record has been provisioned for the device before, or if the device has been designated not to be provisioned with the associated resource, or if the device has been designated to be provisioned with the associated resource by an alternate method, the registration request is denied. If the registration request is approved, the device is provided with a service record 38 generated by server 34 relating to resource 32 that contains links and text that enable the device 10 to access resource 32. Additional services may also be provisioned in the record.

The device is typically capable of using various data display and data collection protocols. In one embodiment, the device is capable of displaying pages in WML and HTML on a display screen, using an application installed on the device. The pages can include forms with dialogs allowing the device's user to enter data into the form using an input device.

The service record delivered to the device is compatible with the device's capabilities for displaying and collecting data. The service records may be simply data packets that contain collections of parameters. Some of those parameters may be references to resources 32 that can be associated either with the device or with specific applications on the device. Those parameters may be in the form of content (such as, but not limited to, HTML or WML links) that is compatible with the display capabilities of the device. But those parameters may also be more abstract pieces of data, such as just an URL and descriptive text associated with each external resource 32 (and possibly an identifier to describe which application(s) on the device each particular link applies to). In those cases, the applications themselves may choose to make those resources available to the user in their own way (such as via a menu item in that application, which, if selected, will access the content indicated by the resource) or by dynamically incorporating an access link within textual or graphical content that the application presented to the user. Additionally, any links can be ordered or presented in the application in a manner determined by a pre-set ranking scheme.

It will be appreciated that resources 32 may be applicable to device 10 as a whole (non-application-specific) and resources 32 may be application-specific. In the case of application-specific external resources, the provisioned information provides an indication of which applications those resources apply to.

Figure 6:
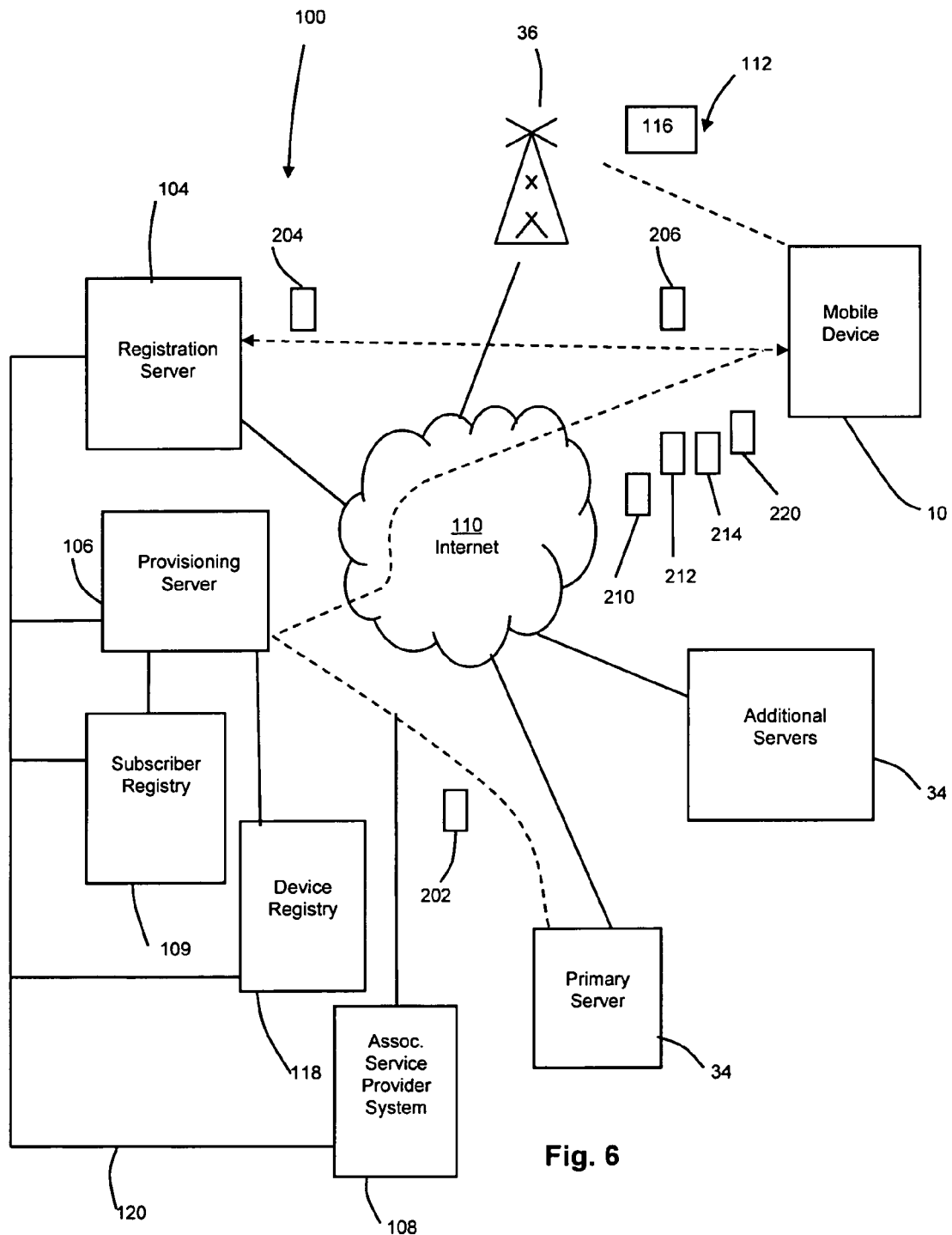
FIG. 6 is a block diagram of a system that may be used to provide a resource to the device of FIG. 1.

Some further aspects of an embodiment will now be described in greater detail with reference to FIG. 6, which illustrates a system 100 for provisioning an associated resource for a mobile communication device 10.

System 100 includes a registration server 34, a provisioning server 106, another resource server 34, a subscriber registry 109 and a device registry 118. System 100 is typically operated by a service provider A, which may provide the associated resource itself or which may provision the associated resource for device 10 on behalf of another service provider (not shown) that provides the associated resource. In the present exemplary embodiment, resource 32 is a help application based as a web page provided by resource server 34.

System 100 communicates with device 10 across a network 110, such as the Internet or a local area or wide area network (LAN or WAN). Typically, although not necessarily, device 10 is a wireless communication device capable of communicating with network 110 using a wireless communication network 36, which typically will be operated by a network operator 116.

In this exemplary embodiment, device 10 is operated by a user who is a subscriber of services provided by network operator 116.

In the present exemplary embodiment, the resource 32 is associated with a server 34, which is provided by a service provider B. In the present exemplary embodiment, the network operator 116 is also service provider B, although the network operator 116 may be a distinct entity from service provider B.

Network operator 116/Service provider B maintains a primary service provider system 114 for recording information relating to users that obtain device 10 and/or the resource 34 from service provider B. In embodiments where the network operator 116 and service provider B are distinct entities, each of them may maintain separate systems to record information relating to the user and the specific equipment (such as device 10) and services and resources (such as the primary resource) that each of them provides to the user.

The components of system 100 may communicate with one another through network 110 or through another network 120. Furthermore, one or more components of system 100 may operate on a single computer system or may be integrated into a single server. For example, registration server 34 and provisioning server 106 may be integrated together or they may operate concurrently on a single computer system. In other embodiments of the present invention, registration server 34 or provisioning server 106 or both may consist of multiple processes operating on two or more computers.

Subscriber registry 109 is used by system 100 to track the status of subscribers, who are users of various devices that have subscribed to network access resources offered by network operator 116.

Typically, additional wireless network operators (not shown), like network operator 116, will provide network access services allowing mobile devices to connect to network 110 and to system 100. This is further described below. Each of these network operators may provide devices to subscribers of their services. Subscriber registry 109 is used to track the status of all such subscribers and the record for each subscriber in subscriber registry 109 may include the identity of the specific network operator who provides network access services to the subscriber.

In the present embodiment, subscriber registry 109 has a record for each subscriber that is known to system 100. This may include subscribers of services and resources provided by network operator 116 (and other network operators) who have not yet provisioned the associated resource for use on their mobile devices in addition to subscribers who have provisioned the associated resource for use on their mobile devices. The status of a subscriber in subscriber registry 109 may one or more of the following:

| Status | Meaning |
| --- | --- |
| Associated resource provisioned for subscriber | The subscriber has provisioned the associated resource his or her mobile device. |
| Associated resource cannot or will not be provisioned for subscriber through the method of this invention | The subscriber is not permitted to use the provisioning method of the present invention. It may be possible to provision the resource using a different method. |
| Subscriber known - associated resource not provisioned | The network operator has reported that the subscriber has subscribed to resources from the network operator, but the subscriber has not yet provisioned the resource for use on his or her mobile device. |
| Subscriber Suspended | The subscriber device has been suspended or blocked. This may be done because the subscriber has failed to pay fees to the network operator or for other reasons. |

These status descriptions are only exemplary and additional status categories may be used to describe the status of a subscriber. In addition, the record for each subscriber may contain additional information related to the resources or services that a subscriber has subscribed to.

Device registry 118 is used by system 100 to track the status of mobile communication devices, such as device 10. All devices for which system 100 has provisioned the associated resource have a record in device registry 118. In addition, the device registry 118 may contain records for devices that are capable of having the associated resource provisioned for them. Subscriber registry 118 may also contain records for devices for which the associated resource cannot or will not be provisioned through the method of this invention. The status of a device may be one or more of the following:

| Status | Meaning |
| --- | --- |
| Associated resource provisioned for device | The associated resource has already been provisioned for the device. |
| Associated resource cannot or will not be provisioned through the method of this invention | The device is not permitted to use the provisioning method of the present invention. It may be possible to provision the resource using a different method. |
| Device activated - associated resource not provisioned | The device is known to have been activated, but the associated resource has not been provisioned for it. This status may be used for a device that has been reported as activated by a network operator. |
| Device known but not activated | The device is known to exist (i.e. the identification code of the device has been assigned to it), but the device has not been activated. |
| Suspended | The device has been suspended or blocked. This may be done because the device has been reported lost or stolen. |

These status descriptions are only exemplary and additional status categories may be used to describe the status of a device. In some embodiments of the present invention, some of these status descriptions may not be used. In addition, the record for each device may contain additional information related to the device's capabilities, other services provisioned by service provider A or other service providers, etc. The status of a device in device registry 118 may be set based on advice from network operator 116. For example, the network operator 118 may advise when it has delivered a device to a user, or when a user has reported a device lost or stolen, or when a device should be suspended because the user has failed to pay required fees, etc.

Returning to the present example, the user obtains the primary service from service provider B, and will enter an arrangement with service provider B relating to the primary service.

The user obtains device 10 and subscribes to wireless network access services from network operator 116. The user obtains e-mail service, which is the primary service, from service provider B. As noted above, network operator 116 and service provider B are the same entity, in this exemplary embodiment.

During manufacturing, device 10 is configured to operate with one or more types of communication networks. For example, network 36 may be a GPRS network which provides "always-on" communication capabilities for mobile devices such as device 10. Device 10 will contain a radio antenna and associated circuitry required to detect the presence of the network 36 and to communicate with other components in the network. Device 10 may also be configured to operate with other types of networks, such as other GSM networks or CDMA networks. During or after manufacture, device 10 will typically also be configured with an identification code such as electronic serial number (ESN) or an International Mobile Equipment Identifier (IMEI) that is typically used for wireless communication devices in GSM networks (such as a GPRS network).

In some embodiments, after device 10 has been manufactured, a record may be created for it subscriber registry 118. If a record is created, the status of device 10 will be set to "Device known but not activated". In the present exemplary embodiment, this is not typically done and a record for the device is not created in the device registry until the device is activated.

Figure 7A:
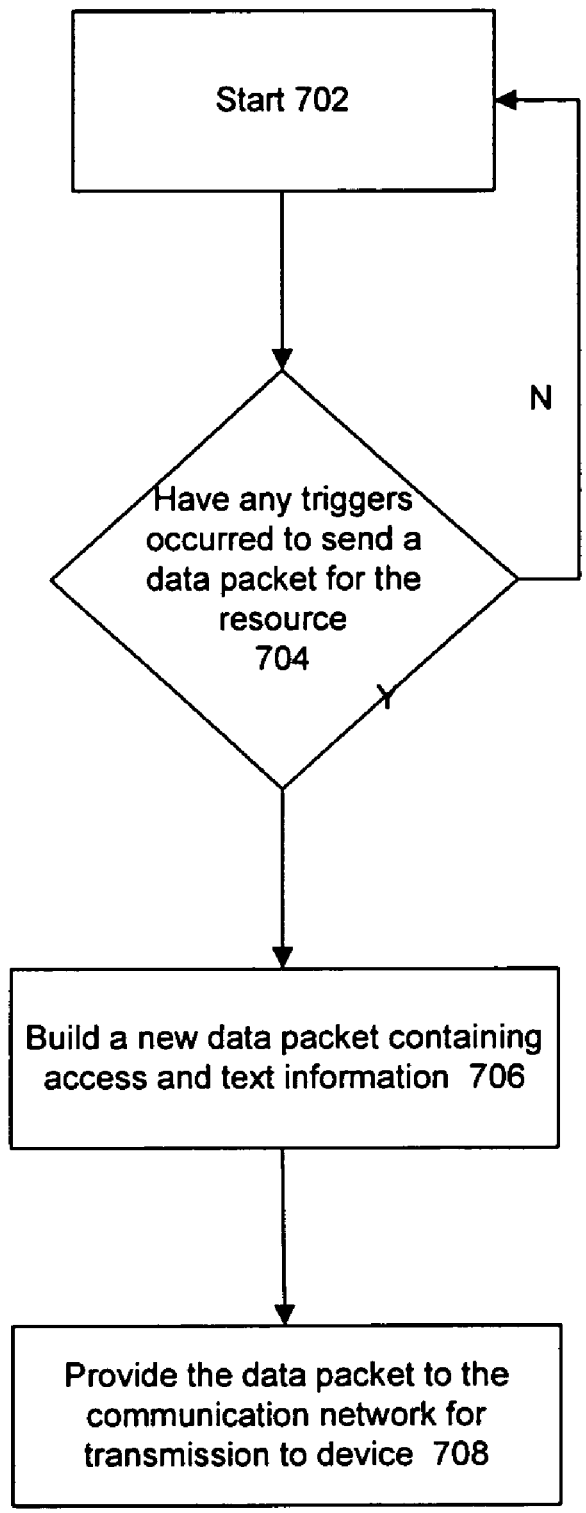
FIG. 7a is a flow chart of exemplary processes and steps conducted by a resource server when providing a data packet relating to a resource to a device in the system of FIG. 6.

Referring to FIG. 7a, flow chart 700 shows exemplary steps and processes executed by resource server 34 in determining how and when to send a new data packet relating to its resource 32 to device 10. After the server has been activated at step 702, it monitors its trigger conditions to determine whether a trigger condition has been activated to generate and send a data packet at step 704. The condition may be that an access parameter has changed or that a new device has been detected or that a timeout condition has occurred. An addition trigger that may be initiated upon startup of device 10 is "Device Not Yet Provisioned". If no trigger condition has occurred, then the if no trigger condition has occurred, then the process returns to start at step 702. If a trigger condition has occurred, then the resource is analyzed for any new access and text information and a data packet containing the information is built at step 706. Next the packet is provided to the communication network for conversion to a transmission signal and transmission to device 10 at step 708. It will be appreciated that in other system other steps may be provided or the steps may be executed in a different order.

Figure 7B:
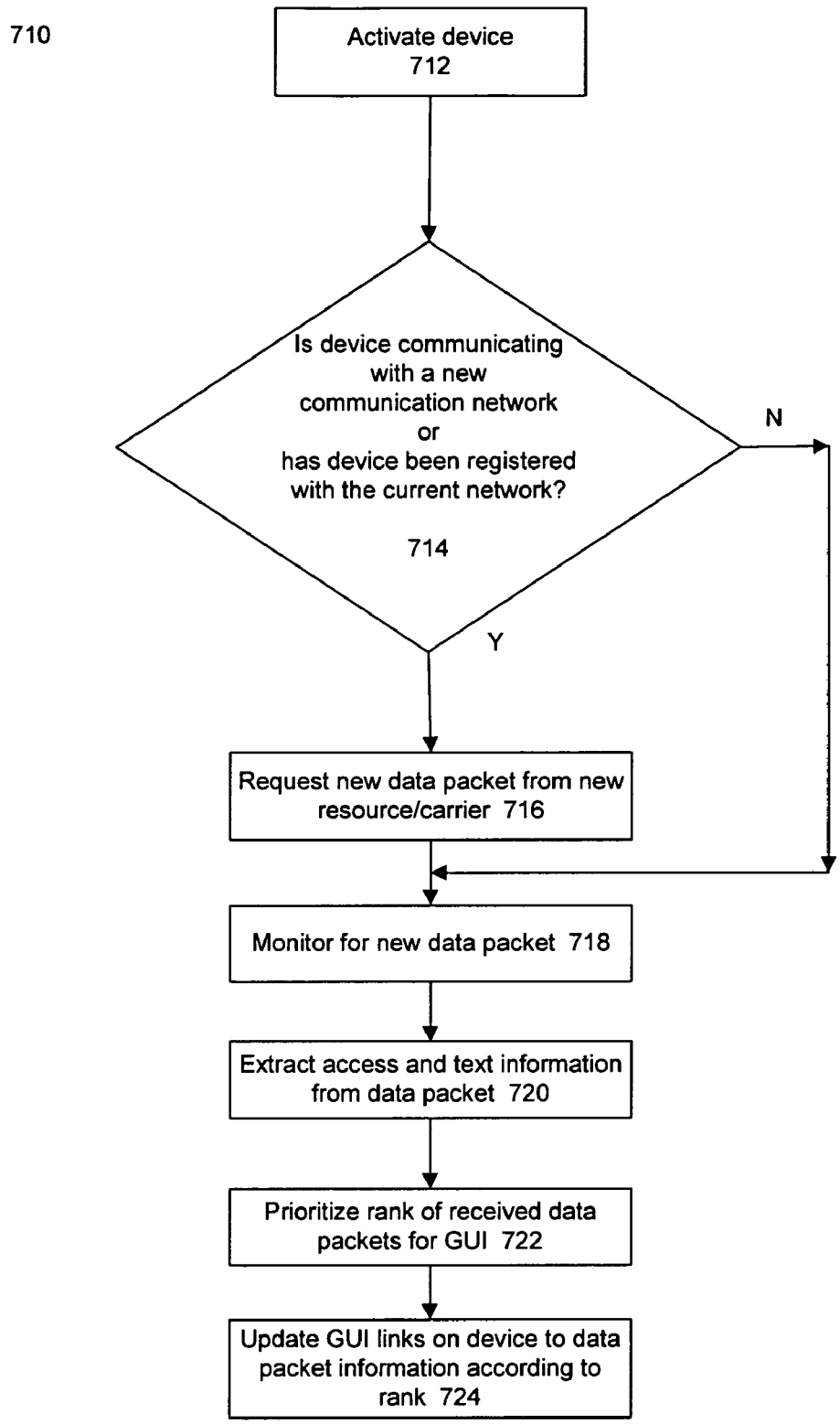
FIG. 7b is a flow chart of exemplary processes and steps conducted by a device when monitoring for and processing a data packet received from a resource from a resource server in the system of FIG. 6.

Referring to FIG. 7b, flow chart 710 shows exemplary steps and processes executed by device 10 in determining when to request a new data packet relating to a resource 32 from server 34 and what to do once a packet is received. After device 10 has been activated at step 712, it checks whether it has roamed to a new carrier service or if it has not been registered with the current carrier service at step 714. If either condition is true, it sends a request for a data packet for the resource through the carrier at step 716. If neither condition is true, it monitors for the receipt of new data packets at step 718. Once a new data packet is received (after either step 716 or 718), at step 720, device 10 extracts the access and display information from the data packet. At step 722, all data from all received data packets from all servers 34 is prioritized. At step 724, the data in ranked and the text data to be populated in the various GUI fields is provided to the GUI. Thereafter, when option application is activated and the user navigates through the GUIs, when a request for a help application is activated, device 10 retrieves the website information associated with the activated help application and provides it to the browser application 40G to fetch and manage the information as it is retrieved from server 34. It will be appreciated that in other devices, other steps may be provided or the steps may be executed in a different order.

Figure 8:
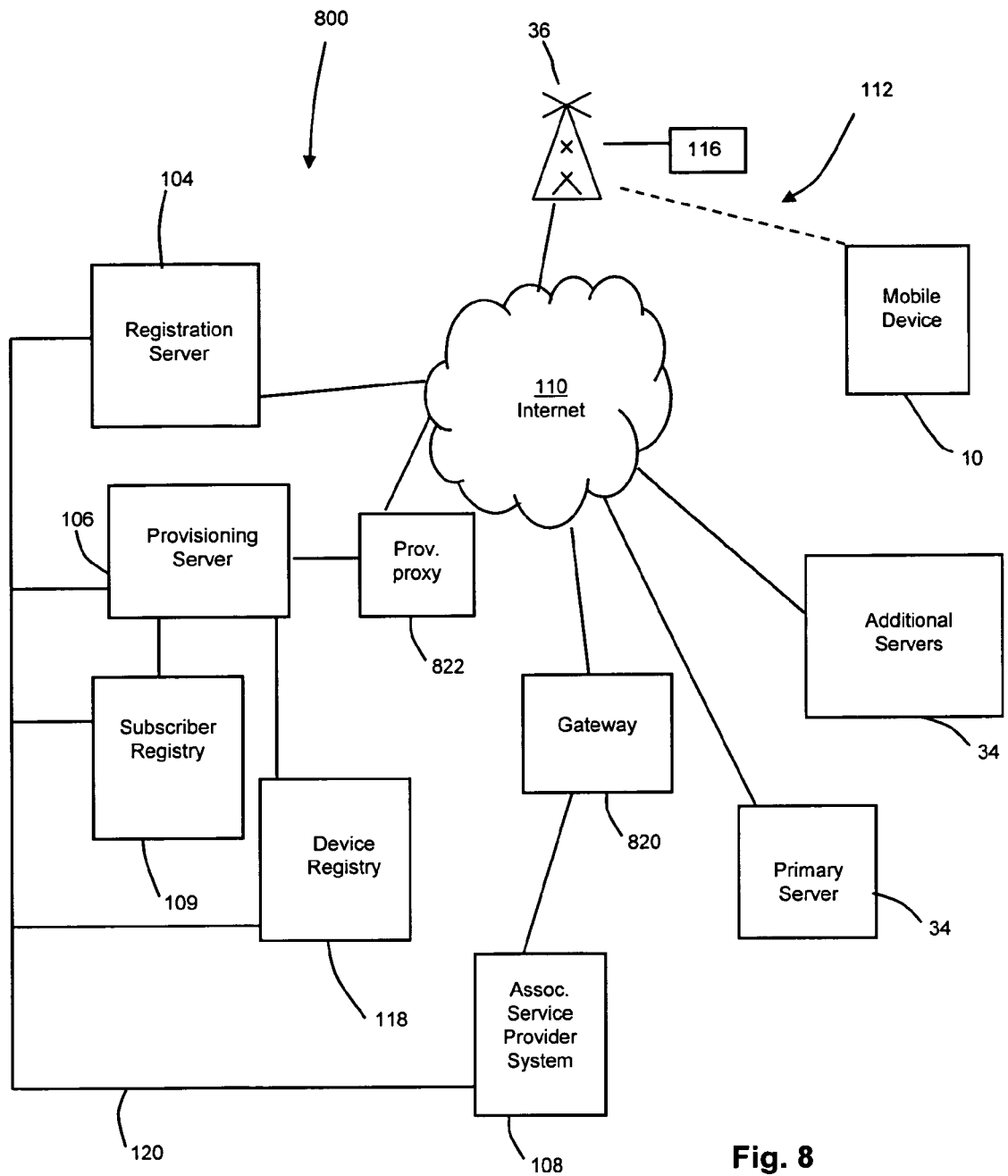
FIG. 8 is a block diagram of another system that may be used to provide a resource to the device of FIG. 1 according to an embodiment.

Reference is next made to FIG. 8, which illustrates another system 400 that may be used by an embodiment. System 800 is similar to system 100 and similar components are given the same reference numeral as in system 100. System 800 includes a gateway 820 and a provisioning proxy 822.

Gateway 820 operates as an interface between device 10 and provisioning server 106 and associated resource. Gateway 820 may be an assembly of one or more computer systems that serve to streamline communications between provisioning server 106 and mobile communication devices such as device 10. Similarly, gateway 820 serves to streamline communications between associated resource provider and mobile communication devices.

Provisioning proxy 822 serves as an interface between gateway 820 and provisioning server 106, similarly serving to streamline communications between gateway 820 and provisioning server 106 by, for example, conducting the operation of pushing service records to device 10. Provisioning proxy 822 may also serve to provide secure communication between device 10 and provisioning server 106.

It will be appreciated that all of the modules, processes, data bases, data processing data transmission and other features and techniques described herein may be implemented in software, firmware and hardware processes and designs using skill of those skilled in the art.

The present invention has been described here by way of example only. Various modification and variations may be made to these exemplary embodiments without departing from the scope of the invention.

We claim:

1. A method of provisioning resources from a server in a network to a mobile electronic device, the method comprising:
   at the server
      after receiving a network registration request from the mobile electronic device, accessing a device registry linking resources managed by the server with mobile electronic devices currently tracked by the server to determine whether the mobile electronic device is in the device registry;
      if the mobile electronic device is in the device registry, determining whether a resource is approved to be provisioned to the mobile electronic device from the server, otherwise, if the mobile electronic device is not in the device registry, awaiting a request from the mobile electronic device for the resource and evaluating the request; and
      determining whether either the resource has already been provisioned to the mobile electronic device or the mobile electronic device has been designated to be provisioned with the resource from an alternative source from the server; and if so, not approving the resource to be provisioned to the mobile electronic device, otherwise providing a data transmission to the mobile electronic device from the server, the data transmission containing text and a link to the resource that can be extracted by the mobile electronic device and used to access the resource and if the resource is new to the mobile electronic device, the data transmission contains an indicator that the resource is new; and
   at the mobile electronic device
      receiving the data transmission at the mobile electronic device;
      incorporating the text and the link from the data transmission into a graphical user interface (GUI) generated on a display of the mobile electronic device to provide an interface to activate the link from the mobile electronic device;
      if the resource is new to the mobile electronic device providing an indicator on the GUI that the resource is new; and
      retrieving the resource from the server when the link is activated through the GUI.

2. The method of provisioning resources from a server in a network to a mobile electronic device as claimed in claim 1, wherein the GUI also provides information about the mobile electronic device that is stored locally on the mobile electronic device.

3. The method of provisioning resources from a server in a network to a mobile electronic device as claimed in claim 2, wherein the resource provides information relating to a wireless carrier associated with the network and the mobile electronic device.

4. The method of provisioning resources from a server in a network to a mobile electronic device as claimed in claim 2, wherein the resource provides information relating to a user's account associated with the network and the mobile electronic device.

5. The method of provisioning resources from a server in a network to a mobile electronic device as claimed in claim 2, wherein:
- a second resource is provided to the mobile electronic device with a second link and second text information relating to the second resource provided to the mobile electronic device; and
- the GUI provides a prioritized presentation of the text information of the resource and the second resource based on a ranking scheme.

6. The method of provisioning resources from a server in a network to a mobile electronic device as claimed in claim 2, wherein the GUI is a help screen generated by a help module operating on the mobile electronic device.

7. The method of provisioning resources from a server in a network to a mobile electronic device as claimed in claim 6, wherein the information is displayed on the GUI when the resource is not provisioned to the mobile electronic device.

8. The method of provisioning resources from a server in a network to a mobile electronic device as claimed in claim 2, wherein the resource relates to another application operating on the mobile electronic device.

9. The method of provisioning resources from a server in a network to a mobile electronic device as claimed in claim 2, wherein the link is an address to an FTP site.

10. The method of provisioning resources from a server in a network to a mobile electronic device as claimed in claim 1, wherein the link is a HTML link.

11. The method of provisioning resources from a server in a network to a mobile electronic device as claimed in claim 1, wherein when the resource is new to said device, a pop-up window is generated in said GUI relating to said resource.

12. The method of provisioning resources from a server in a network to a mobile electronic device as claimed in claim 1, wherein said server checks said device registry to determine whether the resource has been designated to not be provisioned to the mobile electronic device or the mobile electronic device has been designated to be provisioned with the resource from an alternative source.

13. A system that provisions resources in a network to mobile electronic devices, the system comprising:
- a database containing a device registry linking resources in the network with mobile electronic devices currently tracked by the network;
- a provisioning server having access to the database, the provisioning server adapted to
  - after receiving a network registration request from a mobile electronic device, access the device registry to determine whether a resource is approved to be provisioned to the mobile electronic device from the provisioning server;
  - if the mobile electronic device is not in the device registry, await a request for a resource from the mobile electronic device from the provisioning server and evaluating the request; and
  - determine from the device registry whether either the resource has already been provisioned to the mobile electronic device or the mobile electronic device has been designated to be provisioned with the resource from an alternative source from the provisioning server and if so, not approving the resource to be provisioned to the mobile electronic device, otherwise providing a data transmission to the mobile electronic device from the provisioning server, the data transmission containing text and a link to the resource that can be extracted by the mobile electronic device and used to access the resource and the data transmission containing an indicator that the resource is new to the mobile electronic device if the resource is new to the mobile electronic device.

14. The system that provisions resources in a network to mobile electronic devices as claimed in claim 13, wherein the mobile electronic device:
- receives the data transmission at the mobile electronic device;
- incorporates the text and the link from the data transmission into a graphical user interface (GUI) generated on a display of the mobile electronic device to provide an interface to activate the link from the mobile electronic device; and
- retrieves the resource from the provisioning server when the link is activated through the GUI.

15. The system that provisions resources in a network to mobile electronic devices as claimed in claim 13, wherein the link is a HTML link.

16. The system that provisions resources in a network to mobile electronic devices as claimed in claim 13, wherein the link is an address to an FTP site.

17. A method of provisioning resources from a server in a network to a mobile electronic device, the method comprising:
- after receiving a network registration request from the mobile electronic device at the server, accessing a device registry linking resources managed by the server with mobile electronic devices currently tracked by the server to determine whether the mobile electronic device is in the device registry;
- if the mobile electronic device is not in the device registry, awaiting a request from the mobile electronic device for the resource and evaluating the request; and
- if the mobile electronic device is in the device registry determining whether either the resource has already been provisioned to the mobile electronic device or the mobile electronic device has been designated to be provisioned with the resource from an alternative source from the server and if so, not approving the resource to be provisioned to the mobile electronic device, otherwise providing a data transmission to the mobile electronic device from the server, the data transmission containing text and a link to the resource that can be extracted by the mobile electronic device and used to access the resource and if the resource is new to the mobile electronic device, the data transmission contains an indicator that said the resource is new.

18. The method of provisioning resources from a server in a network to a mobile electronic device as claimed in claim 17, wherein said device registry contains status information as to whether the resource has been designated to not be provisioned to the mobile electronic device or the mobile electronic device has been designated to be provisioned with the resource from an alternative source.

* * * * *

UNITED STATES PATENT AND TRADEMARK OFFICE
CERTIFICATE OF CORRECTION

PATENT NO. : 8,122,174 B2  
APPLICATION NO. : 11/394112  
DATED : February 21, 2012  
INVENTOR(S) : Michael Knowles et al.

It is certified that error appears in the above-identified patent and that said Letters Patent is hereby corrected as shown below:

Title Page, Item (73), Assignee name: replace the word "in" with --In--

Signed and Sealed this  
Ninth Day of October, 2012

David J. Kappos  
*Director of the United States Patent and Trademark Office*